(12) United States Patent
Kim et al.

(10) Patent No.: US 12,148,930 B2
(45) Date of Patent: Nov. 19, 2024

(54) NEGATIVE ELECTRODE AND SECONDARY BATTERY INCLUDING THE SAME

(71) Applicant: LG ENERGY SOLUTION, LTD., Seoul (KR)

(72) Inventors: Young Jae Kim, Daejeon (KR); Jung Woo Yoo, Daejeon (KR)

(73) Assignee: LG ENERGY SOLUTION LTD., Seoul (KR)

( * ) Notice: Subject to any disclaimer, the term of this patent is extended or adjusted under 35 U.S.C. 154(b) by 865 days.

(21) Appl. No.: 17/269,221

(22) PCT Filed: Sep. 5, 2019

(86) PCT No.: PCT/KR2019/011507
§ 371 (c)(1),
(2) Date: Feb. 17, 2021

(87) PCT Pub. No.: WO2020/050661
PCT Pub. Date: Mar. 12, 2020

(65) Prior Publication Data
US 2021/0328225 A1   Oct. 21, 2021

(30) Foreign Application Priority Data
Sep. 5, 2018  (KR) .................. 10-2018-0106029

(51) Int. Cl.
*H01M 4/62* (2006.01)
*H01M 4/38* (2006.01)
*H01M 4/02* (2006.01)

(52) U.S. Cl.
CPC ........... *H01M 4/622* (2013.01); *H01M 4/386* (2013.01); *H01M 4/625* (2013.01); *H01M 2004/021* (2013.01); *H01M 2004/027* (2013.01)

(58) Field of Classification Search
CPC .... H01M 4/622; H01M 4/386; H01M 4/5625; H01M 2004/021; H01M 2004/027
See application file for complete search history.

(56) References Cited

U.S. PATENT DOCUMENTS

| 6,573,004 B1 | 6/2003 | Igarashi et al. |
| 2014/0087250 A1 | 3/2014 | Coowar et al. |

(Continued)

FOREIGN PATENT DOCUMENTS

| CN | 106415898 A | 2/2017 |
| CN | 106953068 A | 7/2017 |

(Continued)

OTHER PUBLICATIONS

International Search Report (with partial translation) and Written Opinion issued in corresponding International Patent Application No. PCT/KR2019/011507, dated Dec. 18, 2019.

(Continued)

*Primary Examiner* — James Lee
(74) *Attorney, Agent, or Firm* — Bryan Cave Leighton Paisner LLP

(57) ABSTRACT

The present invention relates to a negative electrode including a current collector and a negative electrode active material layer disposed on the current collector, wherein the negative electrode active material layer includes a negative electrode active material, a conductive agent, and a binder, wherein the negative electrode active material includes silicon particles having an average particle diameter ($D_{50}$) of 4 μm to 10 μm, the conductive agent includes carbon nanotubes and a graphite-type conductive agent, and the binder includes a copolymer containing a polyvinyl alcohol-derived unit and an ionized substituted acrylate-derived unit.

15 Claims, 6 Drawing Sheets

(56) References Cited

U.S. PATENT DOCUMENTS

| | | |
|---|---|---|
| 2014/0356710 A1 | 12/2014 | Chung et al. |
| 2015/0004488 A1 | 1/2015 | Abdelsalam et al. |
| 2015/0044570 A1 | 2/2015 | Kim et al. |
| 2015/0072240 A1* | 3/2015 | Yoo ................. C01B 33/037 216/13 |
| 2016/0156024 A1 | 6/2016 | Kinpara et al. |
| 2016/0190570 A1 | 6/2016 | Lee et al. |
| 2016/0329566 A1* | 11/2016 | Jung ................. H01M 10/0525 |
| 2017/0047584 A1 | 2/2017 | Hwang et al. |
| 2017/0077497 A1 | 3/2017 | Ogata et al. |
| 2018/0062158 A1 | 3/2018 | Kim et al. |
| 2018/0097235 A1 | 4/2018 | Yang et al. |
| 2018/0226650 A1* | 8/2018 | Yoo ................. H01M 4/364 |
| 2018/0294512 A1 | 10/2018 | Kim et al. |

FOREIGN PATENT DOCUMENTS

| | | |
|---|---|---|
| CN | 107785535 A | 3/2018 |
| CN | 108140842 A | 6/2018 |
| EP | 2771929 A1 | 9/2014 |
| EP | 3029759 A1 | 6/2016 |
| JP | H07-226205 A | 8/1995 |
| JP | H11-250915 A | 9/1999 |
| JP | 2006-228640 A | 8/2006 |
| JP | 2015167127 | 9/2015 |
| JP | 2016-110876 A | 6/2016 |
| KR | 10-2014-0018255 A | 2/2014 |
| KR | 2014-0133529 A | 11/2014 |
| KR | 10-2014-0139845 A | 12/2014 |
| KR | 10-2015-0018088 A | 2/2015 |
| KR | 10-2015-0128592 A | 11/2015 |
| KR | 10-2016-0024921 A | 3/2016 |
| KR | 1020160033638 | 3/2016 |
| KR | 10-2017-0033123 A | 3/2017 |
| KR | 10-2018-0007335 A | 1/2018 |
| KR | 10-2018-0036457 A | 4/2018 |
| WO | 2013/061079 A1 | 5/2013 |

OTHER PUBLICATIONS

Extended European Search Report dated Nov. 3, 2021, issued in corresponding European Patent Application No. 19856585.5.

\* cited by examiner

NEGATIVE ELECTRODE AND SECONDARY BATTERY INCLUDING THE SAME

CROSS-REFERENCE TO RELATED APPLICATIONS

This application claims the benefit of Korean Patent Application No. 10-2018-0106029, filed on Sep. 5, 2018, in the Korean Intellectual Property Office, the disclosure of which is incorporated herein in its entirety by reference.

TECHNICAL FIELD

The present invention relates to a negative electrode including a current collector and a negative electrode active material layer disposed on the current collector, wherein the negative electrode active material layer includes a negative electrode active material; a conductive agent; and a binder, wherein the negative electrode active material includes silicon particles having an average particle diameter ($D_{50}$) of 4 μm to 10 μm, the conductive agent includes carbon nanotubes and a graphite-type conductive agent, and the binder includes a copolymer containing a polyvinyl alcohol-derived unit and an ionized substituted acrylate-derived unit.

BACKGROUND ART

Demand for batteries as an energy source has been significantly increased as technology development and demand with respect to mobile devices have recently increased, and a variety of researches on batteries capable of meeting various needs have been carried out accordingly. Particularly, as a power such devices, research into lithium source for secondary batteries having excellent lifetime and cycle characteristics as well as high energy density has been actively conducted.

A lithium secondary battery denotes a battery in which a non-aqueous electrolyte containing lithium ions is included in an electrode assembly which includes a positive electrode including a positive electrode active material capable of intercalating/deintercalating the lithium ions, a negative electrode including a negative electrode active material capable of intercalating/deintercalating the lithium ions, and a microporous separator disposed between the positive electrode and the negative electrode.

A lithium metal, a lithium alloy, crystalline or amorphous carbon, a carbon composite, and a silicon-based active material are being used as the negative electrode active material. Among them, the silicon-based active material is used alone or is used together with other negative electrode active materials in terms of improving capacity of the secondary battery.

Particularly, since silicon particles (pure silicon) in the silicon-based active material have very high capacity, capacity characteristics of the secondary battery may be significantly improved when the negative electrode active material is composed of the silicon particles. However, the silicon particles have limitations in that their volume excessively expands as the battery is charged and discharged. Accordingly, since the negative electrode active material and a conductive agent or the negative electrode active material and a current collector are separated while a structure of the negative electrode is changed, a conductive path in the negative electrode is increased to increase negative electrode resistance. Thus, in reality, it is difficult to configure the negative electrode active material only with the silicon particles.

Since a binder, such as a carboxymethyl cellulose (CMC) and a styrene butadiene rubber (SBR) which have been included in the negative electrode and used together with the negative electrode active material, compensates for a binding force of components such as the negative electrode active material and the conductive agent, the limitations due to the volume expansion may be partially addressed, but its effect is insignificant. A method of controlling the volume expansion by a method of forming a carbon coating layer on surfaces of the silicon particles has also been introduced, but it requires a separate process and a reduction in the capacity is inevitable due to a decrease in silicon content.

Thus, in the present invention, there is a need for a negative electrode having a new configuration which may suppress an increase in the resistance due to the volume expansion even if the silicon particles (pure silicon) are used as the negative electrode active material.

DISCLOSURE OF THE INVENTION

Technical Problem

An aspect of the present invention provides a negative electrode and a secondary battery in which an increase in resistance of the negative electrode may be suppressed and life characteristics of the battery may be improved by maintaining a conductive path despite volume expansion of silicon particles while improving capacity of the battery by using the silicon particles as a negative electrode active material.

Technical Solution

According to an aspect of the present invention, there is provided a negative electrode including a current collector and a negative electrode active material layer collector, wherein the negative disposed on the current electrode active material layer includes a negative electrode active material; a conductive agent; and a binder, wherein the negative electrode active material includes silicon particles having an average particle diameter (D50) of 4 μm to 10 μm, the conductive agent includes carbon nanotubes and a graphite-type conductive agent, and the binder includes a copolymer containing a polyvinyl alcohol-derived unit and an ionized substituted acrylate-derived unit.

According to another aspect of the present invention, there is provided a secondary battery including the negative electrode; a positive electrode; a separator disposed between the positive electrode and the negative electrode; and an electrolyte.

Advantageous Effects

According to the present invention, capacity of a battery may be significantly improved by using silicon particles as a negative electrode active material. Also, even if volume expansion of the silicon particles proceeds during charge and discharge, since a conductive path is maintained by using a specific binder, carbon nanotubes, and a graphite-type conductive agent, an increase in resistance of the battery may be suppressed. Accordingly, life characteristics of a negative electrode may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
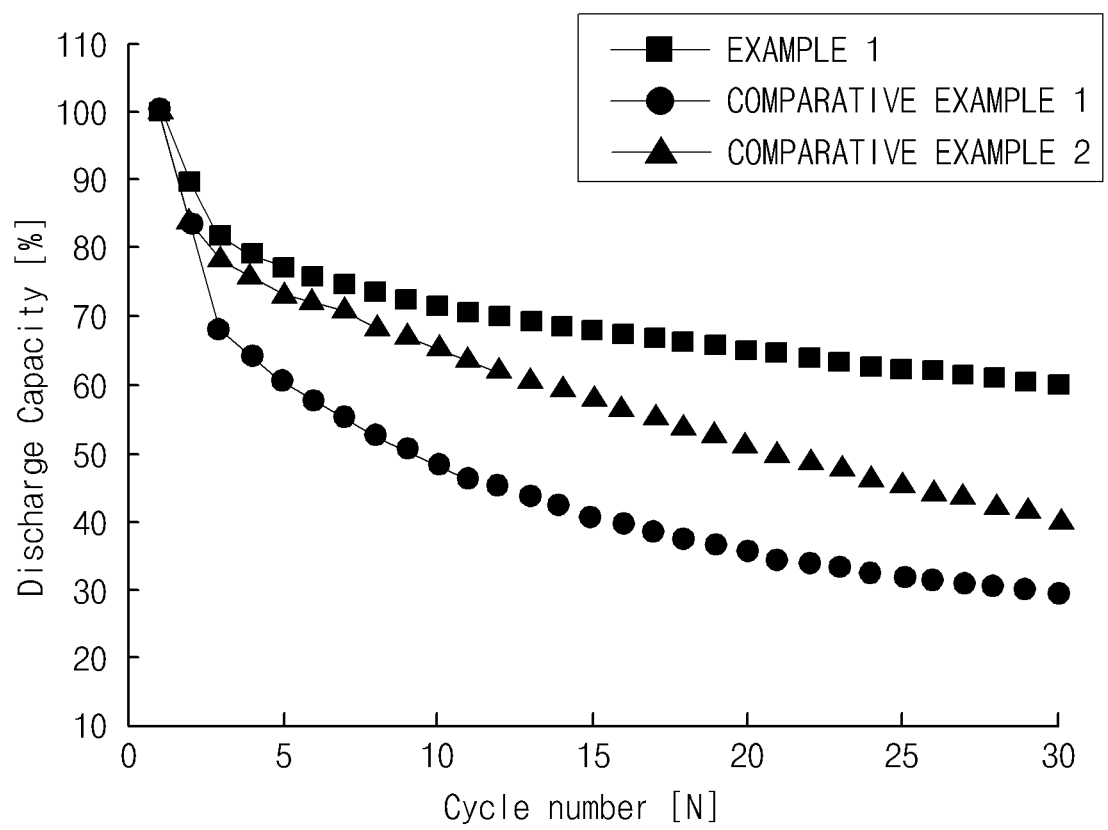
FIG. 1 is a graph illustrating capacity retentions of batteries respectively using negative electrodes of Example 1, Comparative Example 1, and Comparative Example 2 with cycles.

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The expression "average particle diameter (D50)" in the present specification may be defined as a particle diameter at a cumulative volume of 50% in a particle size distribution curve. The average particle diameter (D50), for example, may be measured by using a laser diffraction method. The laser diffraction method may generally measure a particle diameter ranging from a submicron level to a few mm and may obtain highly repeatable and high-resolution results.

<Negative Electrode>

A negative electrode according to an embodiment of the present invention includes a current collector and a negative electrode active material layer disposed on the current collector, wherein the negative electrode active material layer includes a negative electrode active material; a conductive agent; and a binder, wherein the negative electrode active material includes silicon particles having an average particle diameter ($D_{50}$) of 4 μm to 10 μm, the conductive agent includes carbon nanotubes and a graphite-type conductive agent, and the binder may include a copolymer containing a polyvinyl alcohol-derived unit and an ionized substituted acrylate-derived unit.

The negative electrode may include a current collector. The current collector is not particularly limited so long as it has conductivity without causing adverse chemical changes in the battery. For example, copper, stainless steel, aluminum, nickel, titanium, fired carbon, aluminum or stainless steel that is surface-treated with one of carbon, nickel, titanium, silver, or the like may be used. Specifically, a transition metal that absorbs carbon well, such as copper and nickel, may be used as the current collector. The current collector may have a thickness of 6 μm to 20 μm, but the thickness of the current collector is not limited thereto.

The negative electrode active material layer may be disposed on the current collector. The negative electrode active material layer may cover one surface or both surfaces of the current collector. The negative electrode active material layer may include a negative electrode active material, a conductive agent, and a binder.

(1) Negative Electrode Active Material

The negative electrode active material may include silicon particles, and may specifically be composed of the silicon particles. The silicon particle corresponds to a particle formed of only silicon (Si), and may specifically be pure silicon. Since the silicon particle is a material having higher capacity than other negative electrode active materials such as a carbon-based active material particle, SiO, and Si/C, capacity of a battery may be significantly improved when the silicon particles are used as the negative electrode active material. However, since a volume of the silicon particle excessively expands during charge and discharge of the battery to cause limitations such as delithiation of the negative electrode active material and disconnection of a conductive path, life characteristics of the battery are degraded. However, in the present invention, since the above-described limitations may be addressed by controlling other configurations and variables such as a specific binder and its amount, the silicon particles may be used as particles of the negative electrode active material.

The silicon particles may have an average particle diameter ($D_{50}$) of 4 μm to 10 μm, particularly 5.5 μm to 8 μm, and more particularly 6 μm to 7 μm. In a case in which the average particle diameter is less than 4 μm, since a specific surface area of the particle is excessively increased, viscosity of a negative electrode slurry is excessively increased. Accordingly, dispersion of particles constituting the negative electrode slurry is not good. Also, in the case that the diameter of the silicon particles is excessively small, since a contact area between the silicon particles and the conductive agent is reduced due to a composite composed of the conductive agent and the binder in the negative electrode slurry, it is more likely that a conductive network is disconnected, and thus, capacity retention is reduced. In a case in which the average particle diameter is greater than 10 μm, since the excessively large silicon particles are present, a surface of the negative electrode is not smooth, and, accordingly, non-uniformity of current density occurs during charge and discharge. Also, in the case that the diameter of the silicon particles is excessively large, since phase stability of the negative electrode slurry becomes unstable, processability is reduced. Accordingly, the capacity retention of the battery is reduced.

In a case in which the silicon particles have the above average particle diameter, the binder may be uniformly coated on the silicon particles by being adsorbed thereto. Particularly, different from a styrene butadiene rubber (SBR) adhered to the negative electrode active material in the form of a dot, since the binder included in the negative electrode of the present invention may be adhered to the silicon particles in the form of a plane, the silicon particles may be more smoothly and uniformly coated with the binder. Also, in the case that the silicon particles having the above average particle diameter is used, an appropriate amount of the binder may be adsorbed to the silicon particles to contribute to suppress the excessive volume expansion of the silicon particles and to prevent the disconnection of the conductive path. Simultaneously, the binder remained in a state of not being adsorbed on surfaces of the silicon particles contributes to maintain the phase stability of the entire negative electrode slurry. Specifically, since the binder may act as a resistance to sedimentation of the negative electrode active material, the negative electrode active material may be uniformly dispersed in the negative electrode slurry, and thus, a stable negative electrode slurry may be prepared. That is, the above average particle diameter range corresponds to an optimum particle diameter range which derives an appropriate ratio of the binder that contributes to the volume expansion of the silicon particles to the remaining binder that contributes to maintain the phase stability of the negative electrode slurry.

The silicon particles may have a $D_{10}$ of 0.2 μm or more and may have a $D_{90}$ of 20 μm or less, and a difference between the $D_{90}$ and the $D_{10}$ may be 15 μm or less. When this condition is satisfied, capacity retention after continuous charge and discharge may be improved.

In some cases, the negative electrode active material may further include graphite. The graphite may be natural graphite and/or artificial graphite. In this case, output of the battery may be improved.

The negative electrode active material may be included in an amount of 60 wt % to 80 wt %, particularly 65 wt % to 75 wt %, and more particularly 68 wt % to 72 wt % in the negative electrode active material layer. In a case in which the above range is satisfied, energy density of the negative electrode may be formed at a high level while maintaining amounts of the conductive agent and the binder at a desired level.

(2) Conductive Agent

The conductive agent acts to secure a conductive path in the negative electrode.

The conductive agent may be included in an amount of 7 wt % to 13 wt %, particularly 8 wt % to 12 wt %, and more particularly 9 wt % to 11 wt % in the negative electrode active material layer. In a case in which the above range is satisfied, resistance in the negative electrode to which an excessive amount of the binder is added may be reduced. Also, it is possible to minimize the disconnection of the conductive path due to the volume change of the silicon particles by the sufficient amount of the conductive material. The above range may be higher than an amount of the conductive agent in a conventional negative electrode. In a case in which the amount of the conductive agent is increased, the amount of the negative electrode active material, particularly the silicon particles, may be reduced. However, since capacity of the silicon particle is high, it is possible to secure capacity of the battery even by a small amount of the silicon particles. In other words, since the capacity of the battery may be secured even by the small amount of the silicon particles, the resistance in the negative electrode may be reduced by increasing the amount of the conductive agent.

The conductive agent may include carbon nanotubes and a graphite-type conductive agent, and may be specifically composed of the carbon nanotubes and the graphite-type conductive agent.

1) Carbon Nanotubes

The carbon nanotubes may act to improve conductivity of the negative electrode by being adsorbed to the surfaces of the silicon particles in the negative electrode. Since the silicon particles and the binder, which are introduced in the present invention, have almost no conductivity, the resistance of the negative electrode may be reduced by using the carbon nanotubes with high conductivity. However, since the viscosity of the negative electrode slurry is excessively increased when an excessive amount of the carbon nanotubes is used alone as the conductive agent, it is difficult to prepare the negative electrode and performance of the negative electrode prepared is not excellent. Thus, in the present invention, the graphite-type conductive agent is used together with the carbon nanotubes as the conductive material. The graphite-type conductive agent allows the conductive agent to be smoothly dispersed in the negative electrode slurry and allows the viscosity of the negative electrode slurry not to be increased excessively high.

The carbon nanotubes may be bundle-type carbon nanotubes. The bundle-type carbon nanotubes may include a plurality of carbon nanotube units. Specifically, the expression "bundle type" used herein, unless otherwise specified, refers to a secondary shape in the form of a bundle or rope in which the plurality of carbon nanotube units are aligned side by side or intertwined in substantially the same orientation as a longitudinal axis of the carbon nanotube unit. In the carbon nanotube unit, a graphite sheet has a cylindrical shape with a nano-sized diameter and has an $sp^2$ bond structure. In this case, the carbon nanotube unit may exhibit characteristics of a conductor or semiconductor depending on a structure and an angle at which the graphite sheet is rolled. Since the bundle-type carbon nanotubes may be more uniformly dispersed during the preparation of the negative electrode than entangled-type carbon nanotubes and may smoothly form a conductive network in the negative electrode, the conductivity of the negative electrode may be improved.

The carbon nanotube unit may be classified into a single-walled carbon nanotube (SWCNT) unit, a double-walled carbon nanotube (DWCNT) unit, and a multi-walled carbon nanotube (MWCNT) unit depending on the number of bonds forming the wall. Specifically, the carbon nanotube unit may be a multi-walled carbon nanotube unit. The multi-walled carbon nanotube unit is preferable in terms of having lower energy required for dispersion than the single-walled carbon nanotube unit or the double-walled carbon nanotube unit and having an easily controllable dispersion condition.

The carbon nanotube unit may have an average diameter of 10 nm to 50 nm, specifically 15 nm to 40 nm, and more specifically 20 nm to 30 nm. In a case in which the average diameter of the carbon nanotube unit satisfies the above range, since the carbon nanotubes may be uniformly dispersed in the negative electrode slurry, the conductivity of the negative electrode prepared may be improved. The average diameter may be an average value of diameters of five carbon nanotube units which are measured with a transmission electron microscope (TEM) or a scanning electron microscope (SEM).

The carbon nanotubes may have a Brunauer-Emmett-Teller (BET) specific surface area of 100 $m^2/g$ to 300 $m^2/g$, specifically 150 $m^2/g$ to 290 $m^2/g$, and more specifically 260 $m^2/g$ to 280 $m^2/g$. In a case in which the BET specific surface area of the carbon nanotubes satisfies the above range, since the carbon nanotubes may be uniformly dispersed in the negative electrode slurry, the conductivity of the negative electrode prepared may be improved. The BET specific surface area may be measured by a nitrogen adsorption BET method.

2) Graphite-Type Conductive Agent

The graphite-type conductive agent improves conductivity by increasing planar contacts between the silicon particles in the negative electrode and suppresses the disconnection of the conductive path due to the volume change at the same time.

The graphite-type conductive agent may include at least one selected from the group consisting of plate-shaped graphite, graphene, graphene oxide, and graphite flakes, and may preferably be plate-shaped graphite.

The graphite-type conductive agent may have an average particle diameter ($D_{50}$) of 2 μm to 7 μm, particularly 3 μm to 6 μm, and more particularly 4 μm to 5 μm. In a case in which the above range is satisfied, dispersion is easy while an excessive increase in the viscosity of the negative electrode slurry is not caused due to the sufficient particle diameter. Thus, a dispersion effect is excellent when the same equipment and time are used to perform the dispersion.

The graphite-type conductive agent may have a BET specific surface area of 15 $m^2$/g to 20 $m^2$/g, specifically 15 $m^2$/g to 19 $m^2$/g, and more specifically 16 $m^2$/g to 18 $m^2$/g. In a case in which the above range is satisfied, the excessive increase in the viscosity of the negative electrode slurry may be suppressed while the graphite-type conductive agent may be uniformly dispersed in the negative electrode slurry. Accordingly, the conductivity of the negative electrode prepared and processability in the preparation of the negative electrode may be improved. The BET specific surface area may be measured by a nitrogen adsorption BET method.

A weight ratio of the carbon nanotubes to the graphite-type conductive agent may be in a range of 6:94 to 30:70, specifically 10:90 to 26:74, and more specifically 17:83 to 22:78. In a case in which the above range is satisfied, the viscosity and viscoelasticity of the negative electrode slurry are stable.

Since the carbon nanotubes have a relatively higher specific surface area, the carbon nanotubes excessively increase the viscosity of the negative electrode slurry during the dispersion when the carbon nanotubes are excessively included, and flowability may be reduced because the viscoelasticity of the negative electrode slurry is excessively increased due to strong attraction between the carbon nanotubes. In contrast, since the graphite-type conductive agent has a relatively larger particle diameter and a relatively lower specific surface area, the graphite-type conductive agent may increase the flowability of the negative electrode slurry without an increase in the viscosity. That is, in order to improve the life characteristics of the battery by uniformly forming the negative electrode active material layer through the preparation of the negative electrode slurry having stable viscosity and viscoelasticity, an appropriate ratio may be selected as described above.

(3) Binder

The binder may include a copolymer containing a polyvinyl alcohol-derived unit and an ionized substituted acrylate-derived unit, and may specifically be composed of the copolymer.

With respect to a negative electrode of a conventional secondary battery, both aqueous-based and non-aqueous-based preparations are possible, wherein, with respect to the aqueous-based preparation, a carboxymethyl cellulose (CMC) and a styrene butadiene rubber (SBR) are generally used as a binder. There are limitations in that cracks between negative electrode active material particles are generated and the conductive path in the negative electrode is disconnected due to the volume change of the negative electrode which is generated as the battery is charged and discharged, wherein, particularly, in a case in which silicon particles are used as the negative electrode active material, the volume excessively expands to degrade the life characteristics of the battery. The limitations may not be completely addressed by only the conventional binder.

However, since the binder in the present invention includes a copolymer containing a polyvinyl alcohol-derived unit and an ionized substituted acrylate-derived unit, the limitations may be addressed. Specifically, since the copolymer may secure phase stability and adhesion despite it is a single binder, a preparation process may not only be simplified, but also a solid content of the negative electrode slurry may be increased, the disconnection of the conductive path due to the volume change of the negative electrode active material may be suppressed, deformation of the negative electrode may be prevented by excellent adhesion despite the volume change of the negative electrode, and excellent charge/discharge life characteristics may be secured. Particularly, since the copolymer contains the ionized substituted acrylate-derived unit, the adhesion may be significantly improved in comparison to a case where a non-ionized unsubstituted acrylate-derived unit is contained.

Specifically, when examining a case where the copolymer is used together with the silicon particles, it has the following effect. The silicon particles excessively expand during charge and discharge. With respect to a carboxymethyl cellulose (CMC) and a styrene butadiene rubber (SBR) which are generally used binders, the CMC or SBR, which is adsorbed to the silicon particles, is not broken when the silicon particles expand, but is elongated and is not recovered again. Accordingly, there is a limitation in that it is difficult to maintain a conductive path or network between the silicon particles. In contrast, with respect to the copolymer, a portion of the copolymer is broken when the silicon particles expand, and, since a minimum amount of the remaining copolymer capable of acting as a sufficient resistance to the volume expansion is present in a state of being adsorbed to the silicon particles, it acts to suppress the volume expansion of the silicon particles. Also, accordingly, the conductive path or network between the silicon particles may be maintained. Thus, the life characteristics of the battery may be improved.

The ionized substituted acrylate-derived unit may be formed by a process in which alkyl acrylate is copolymerized as a monomer and then substituted by adding an excessive amount of an ionic aqueous solution. In this case, the ionized substituted acrylate-derived unit in the final copolymer structure may be understood as an acrylate-derived unit ionized and substituted based on the ionized substituted final polymer regardless of the acrylate (for example, alkyl acrylate) used as a raw material.

In the copolymer, a mole fraction of the ionized substituted acrylate-derived unit in a total number of moles of units excluding the polyvinyl alcohol-derived unit may be in a range of 98 mol % or more to 100 mol %, and may be specifically 100 mol %. The expression "100 mol %" denotes that all of the remaining units excluding the polyvinyl alcohol-derived unit are the ionized substituted acrylate-derived unit, and denotes that an unsubstituted acrylate-derived unit is not present. The expression "98 mol % or more" denotes that a non-ionized unsubstituted acrylate-derived unit is present when all hydrogen atoms in the acrylate-derived unit are intentionally ionized by performing the substitution process, wherein an amount of the non-ionized unsubstituted acrylate-derived unit is only very small, within an error range (e.g., less than 2 mol %).

The non-ionized unsubstituted acrylate-derived unit includes a hydroxyl group (—OH). In a case in which a large amount of the non-ionized unsubstituted acrylate-derived unit is contained in the copolymer, for example, the non-ionized unsubstituted acrylate-derived unit is contained in an amount of 2 mol % or more, since crystallization proceeds to a high level by hydrogen bonding force after the negative electrode slurry is dried, the copolymer breaks too easily. Accordingly, an amount of "the unbroken copolymer" capable of suppressing the volume expansion of the silicon particles is significantly reduced, and an amount of the copolymer adsorbed to the silicon particles is reduced. Accordingly, adhesion between the negative electrode active material layer and the current collector is reduced, and the life characteristics of the battery are degraded.

However, the copolymer used in the present invention does not contain the non-ionized unsubstituted acrylate-derived unit or contains only a small amount (error range) of less than 2 mol %, wherein a degree of crystallization of the copolymer is reduced to an appropriate level by metal cations substituting hydrogen. Thus, since the remaining copolymer is adsorbed to the silicon particles in an unbroken state even if the breakage of some copolymers occurs during the volume expansion of the silicon particles, the adhesion between the negative electrode active material layer and the current collector may be improved the life and characteristics of the battery may be improved.

The mole fraction may be measured as follows. First, gas chromatography/mass spectrometry (GC/MS) analysis is performed on the copolymer in a powder state using EQC-0107 (Pyrolyzer (PY-2020/Agilent6890N GC/5973N MSD)) so that a correct functional group is identified through the GC/MS analysis. Thereafter, solid NMR (Agilent 600 MHz NMR) or solution NMR (Bruker 600 MHz NMR) is performed to identify a content ratio for each composition from an integrated value of peaks of the measured graph.

In the copolymer, the polyvinyl alcohol-derived unit may include a unit of the following Formula 1.

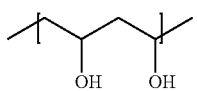

[Formula 1]

The ionized substituted acrylate-derived unit includes a unit of the following Formula 2, wherein, in Formula 2, R is at least one metal cation selected from the group consisting of sodium cation ($Na^+$), lithium cation ($Li^+$), and potassium cation ($K^+$)

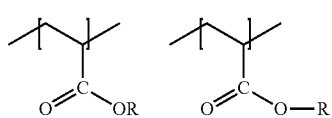

[Formula 2]

Furthermore, the copolymer may include 2,000 to 3,000 units of Formula 1, and may include 1,000 to 2,000 units of Formula 2.

The copolymer may be a block copolymer formed by including the polyvinyl alcohol-derived unit and the ionized substituted acrylate-derived unit. That is, the copolymer has a structure in which a unit block derived from polyvinyl alcohol and a unit block derived from ionized acrylate are linearly connected, and may be a structure constituting a main chain.

The polyvinyl alcohol-derived unit and the ionized substituted acrylate-derived unit denotes a structure formed by an addition reaction of polyvinyl alcohol and acrylate units having a double bond, and, with respect to acrylate, a substituent bonded to ester in the final copolymer structure and a substituent in a raw material may not necessarily coincide with each other.

The ionized substituted acrylate may be more preferably at least one selected from the group consisting of sodium acrylate and lithium acrylate, and may be most preferably sodium acrylate.

The sodium acrylate and lithium acrylate may be formed by a process in which alkyl acrylate is copolymerized as a monomer and then substituted by adding an excessive amount of a sodium ion or lithium ion aqueous solution. In this case, in the final copolymer structure, the acrylate-derived unit may be understood as a sodium acrylate-derived unit or a lithium acrylate-derived unit regardless of the acrylate (for example, alkyl acrylate) used as a raw material.

The copolymer may contain the polyvinyl alcohol-derived unit and the ionized substituted acrylate-derived unit in a weight ratio of 6:4 to 8:2. In a case in which the polyvinyl alcohol-derived unit and the ionized substituted acrylate-derived unit are contained within the above weight ratio range, the copolymer is adsorbed to the particle by polyvinyl alcohol having a hydrophilic group to maintain appropriate dispersibility and the adsorbed polymer forms a film after drying to achieve stable adhesion. Also, the formed film may be advantageous in that it helps to improve battery performance while forming a uniform and highly dense solid electrolyte interface (SEI) during charge and discharge of the battery.

In a case in which the polyvinyl alcohol is contained in an amount less than the above weight ratio, since a solid content, which may be dissolved in water, is reduced while hydrophilic properties are weakened, a phenomenon, in which the binder floats on a surface of the electrode, is strong to affect the performance and the binder may be adsorbed to a hydrophobic surface of the negative electrode active material but may have problems in dispersion. In a case in which the polyvinyl alcohol is contained in an amount greater than the above weight ratio, while a lot of bubbles are generated during dissolution or mixing due to inherent properties of the PVA, particles are adsorbed to the bubbles and aggregated to form undispersed macromolecular particles, wherein this represents degradation of cell performance and may cause various problems.

The copolymer may have a weight-average molecular weight of 100,000 to 500,000. In a case in which the weight-average molecular weight of the copolymer is less than 100,000, since dispersion between the copolymers is weakened, there is a high possibility of aggregation between the binders and an improvement in the charge/discharge life characteristics may be difficult, and, in a case in which the weight-average molecular weight of the copolymer is greater than 500,000, since it is difficult to dissolve the copolymer at a high concentration, it is inadequate to increase the solid content of the negative electrode slurry and gelation tends to occur during polymerization.

The binder may be included in an amount of 13 wt % to 27 wt %, particularly 14 wt % to 23 wt %, and more particularly 18 wt % to 21 wt % in the negative electrode active material layer. In a case in which the binder is composed of the copolymer, the binder may be included within the above amount range in the negative electrode active material layer.

In a case in which the amount of the binder is less than 13 wt %, since an amount of small unit of copolymers generated from the copolymer during the volume expansion of the silicon particles is not sufficient, it is difficult to secure the conductive path. Accordingly, the life characteristics of the battery are degraded. In contrast, in a case in which the amount of the binder is greater than 27 wt %, since the dispersion of the binder is not good, the amount of the binder or the conductive agent in the negative electrode is not uniform, and thus, the resistance in the negative electrode becomes non-uniform and the life characteristics or other performances of the battery are degraded.

A weight ratio of the silicon particles to the binder may be in a range of 1:0.228 to 1:0.343, particularly 1:0.242 to 1:0.329, and more particularly 1:0.257 to 1:0.315. In a case in which the above range is satisfied, a negative electrode slurry having high phase stability may be formed.

<Secondary Battery>

The present invention provides a secondary battery including a positive electrode, a negative electrode, an electrolyte solution, and a separator, wherein the negative electrode is the same as the above-described negative electrode according to the embodiment and the secondary battery may be a lithium secondary battery.

The secondary battery may be prepared according to a typical method known in the art. For example, the secondary battery may be prepared by disposing the separator between the positive electrode and the negative electrode and injecting the electrolyte solution in which a lithium salt is dissolved.

The positive electrode may include a positive electrode active material. A lithium transition metal oxide may be preferably used as the positive electrode active material, and, the positive electrode active material, for example, may be a mixture of at least one selected from the group consisting of $Li_{x1}CoO_2$ (0.5<x1<1.3), $Li_{x2}NiO_2$ (0.5<x2<1.3), $Li_{x3}MnO_2$ (0.5<x3<1.3), $Li_{x4}Mn_2O_4$ (0.5<x4<1.3), $Li_{x5}(Ni_{a1}Co_{b1}Mn_{c1})O_2$ (0.5<x5<1.3, 0<a1<1, 0<b1<1, 0<c1<1, a1+b1+c1=1), $Li_{x6}Ni_{1-y1}Co_{y1}O_2$ (0.5<x6<1.3, 0<y1<1), $Li_{x7}Co_{1-y2}Mn_{y2}O_2$ (0.5<x7<1.3, 0≤y2<1), $Li_{x8}Ni_{1-y3}Mn_{y3}O_2$ (0.5<x8<1.3, 0≤y3<1), $Li_{x9}(Ni_{a2}Co_{b2}Mn_{c2})O_4$ (0.5<x9<1.3, 0<a2<2, 0<b2<2, 0<c2<2, a2+b2+c2=2), $Li_{x10}Mn_{2-z1}Ni_{z1}O_4$ (0.5<x10<1.3, 0<z1<2), $Li_{x11}Mn_{2-z2}CO_{z2}O_4$ (0.5<x11<1.3, 0<z2<2), $Li_{x12}CoPO_4$ (0.5<x12<1.3), and $Li_{x13}FePO_4$ (0.5<x13<1.3).

A typical porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator included in the lithium secondary battery according to the present invention. Also, a typical porous nonwoven fabric, for example, a nonwoven fabric formed of high melting point glass fibers or polyethylene terephthalate fibers may be used, but the separator is not limited thereto.

The electrolyte solution included in the lithium secondary battery according to the present invention may be a mixed organic solvent of at least one selected from the group consisting of propylene carbonate (PC), ethylene carbonate (EC), diethyl carbonate (DEC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethylmethyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, and butyl propionate.

Also, the electrolyte solution according to the present invention may further include a lithium salt, and an anion of the lithium salt may be at least one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $F_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The lithium secondary battery according to the present invention may be a cylindrical type secondary battery, battery, and a pouch type a prismatic type secondary secondary battery, but the lithium secondary battery is not limited thereto as long as it corresponds to a charge and discharge device.

Furthermore, the present invention provides a battery module including the lithium secondary battery as a unit cell and a battery pack including the battery module.

The battery pack may be used as a power source of at least one medium and large sized device selected from the group consisting of a power tool; electric cars including an electric vehicle (EV), a hybrid electric vehicle (HEV), and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Preparation Example 1: Preparation of Copolymer 26.7 g of methyl acrylate and 53.3 g of polyvinyl alcohol were dissolved in 320 g of benzene and stirred in a 1 L reaction vessel equipped with a heater, a cooler, and a stirrer. 2.256 g of benzoyl peroxide was added as an initiator and 16.8 g of 1-butanethiol was added as a chain transfer agent. The temperature was increased to 110° C. in a nitrogen atmosphere. After 4 hours reaction time, the initiator and monomers were washed using methanol, and powder generated was then stirred in an excessive amount of n-hexane. An excessive amount of a 5N NaOH solution was added to the stirred solution and stirred for 2 hours to substitute methyl of the methyl acrylate with sodium (Na) ions. After the reaction, the solution thus obtained was settled to obtain powder, and the powder was dried in an oven at 60° C. to obtain a final copolymer synthesized.

The prepared copolymer had a weight-average molecular weight of 360,000, and a weight ratio of a polyvinyl alcohol-derived unit to an acrylate-derived unit, in which the methyl was substituted with the sodium ions, was 6.7:3.3.

In the copolymer, a mole fraction of the ionized substituted acrylate-derived unit in units excluding the polyvinyl alcohol-derived unit was 100 mol %.

The mole fraction was measured as follows. First, GC/MS analysis was performed on the copolymer in a powder state using EQC-0107 (Pyrolyzer (PY-2020/Agilent6890N GC/5973N MSD)) so that a correct functional group was identified through the GC/MS analysis. Thereafter, solid NMR (Agilent 600 MHz NMR) or solution NMR (Bruker 600 MHz NMR) was performed to identify a content ratio for each composition from an integrated value of peaks of the measured graph. As a result, the mol fraction of the ionized substituted acrylate-derived unit was identified.

Preparation Example 2: Preparation of Copolymer 26.7 g of methyl acrylate and 53.3 g of polyvinyl alcohol were dissolved in 320 g of benzene and stirred in a 1 L reaction vessel equipped with a heater, a cooler, and a stirrer. 2.256 g of benzoyl peroxide was added as an initiator and 16.8 g of 1-butanethiol was added as a chain transfer agent. The temperature was increased to 110° C. in a nitrogen atmosphere. After 4 hours reaction time, the initiator and monomers were washed using methanol, and powder generated was then stirred in an excessive amount of n-hexane. An excessive amount of a 1N NaOH solution was added to the stirred solution and stirred for 2 hours to substitute methyl of the methyl acrylate with Na ions. After the reaction, the solution thus obtained was settled to obtain powder, and the powder was dried in an oven at 60° C. to obtain a final copolymer synthesized.

The prepared copolymer had a weight-average molecular weight of 360,000, and a weight ratio of a polyvinyl alcohol-derived unit to an acrylate-derived unit, in which the methyl was substituted with the sodium ions, was 6.7:3.3.

In the copolymer, a mole fraction of the ionized substituted acrylate-derived unit in units excluding the polyvinyl alcohol-derived unit was 58.6 mol %.

Preparation Example 3: Preparation of Copolymer 26.7 g of methyl acrylate and 53.3 g of polyvinyl alcohol were dissolved in 320 g of benzene and stirred in a 1 L reaction vessel equipped with a heater, a cooler, and a stirrer. 2.256 g of benzoyl peroxide was added as an initiator and 16.8 g of 1-butanethiol was added as a chain transfer agent. The temperature was increased to 110° C. in a nitrogen atmosphere. After 4 hours reaction time, the initiator and monomers were washed using methanol, and powder generated was stirred in an excessive amount of n-hexane. After the reaction, the solution thus obtained was settled to obtain powder, and the powder was dried in an oven at 60° C. to obtain a final copolymer synthesized.

The prepared copolymer had a weight-average molecular weight of 360,000, and a weight ratio of a polyvinyl alcohol-derived unit to an acrylate-derived unit (unsubstituted unit) was 6.7:3.3.

In the copolymer, a mole fraction of an ionized substituted acrylate-derived unit in units excluding the polyvinyl alcohol-derived unit was 0 mol %.

TABLE 1

| | Binder type | Weight ratio of negative electrode active material, conductive agent (CNT, graphite-type conductive agent), and binder | Negative electrode active material | Silicon particle diameter (μm) | Weight ratio of CNT: graphite-type conductive agent |
|---|---|---|---|---|---|
| Example 1 | Preparation Example 1 | 70:10:20 | Silicon | 6 | 20:80 |
| Example 2 | Preparation Example 1 | 70:10:20 | Silicon | 6 | 25:75 |
| Example 3 | Preparation Example 1 | 70:10:20 | Silicon | 6 | 15:85 |
| Example 4 | Preparation Example 1 | 70:16:14 | Silicon | 6 | 20:80 |
| Example 5 | Preparation Example 1 | 70:4:26 | Silicon | 6 | 20:80 |
| Example 6 | Preparation Example 2 | 70:10:20 | Silicon | 6 | 20:80 |
| Comparative Example 1 | Preparation Example 1 | 70:10:20 | Silicon | 3 | 20:80 |
| Comparative Example 2 | Preparation Example 1 | 70:10:20 | Silicon | 15 | 20:80 |
| Comparative Example 3 | Preparation Example 3 | 70:10:20 | Silicon | 6 | 20:80 |
| Comparative Example 4 | Preparation Example 1 | 70:10:20 | Silicon | 6 | 0:100 |
| Comparative Example 5 | CMC, SBR | 70:10:20 | Silicon | 6 | 20:80 |

Example 1: Preparation of Secondary Battery (1) Carbon Nanotube Dispersion Preparation Bundle-type carbon nanotubes (BET specific surface area was 210 m$^2$/g) composed of multi-walled carbon nanotube units having an average diameter of 15 nm and an average length of 15 μm were used, polyvinyl pyrrolidone (PVP) was used as a dispersant, and water was used as a dispersion medium.

0.595 g of the carbon nanotubes, 0.119 g of the dispersant, and 10.45 g of the dispersion medium were mixed and then stirred for 20 minutes using a Homomixer. The mixture was mixed for 3 hours using a Netzsch bead mill (NETZSCH MiniCer, bead size: 1 mm, speed: 3,000 rpm) to obtain a carbon nanotube dispersion.

(2) Preparation of Negative Electrode Slurry 7.14 g of the copolymer prepared in Preparation Example 1 was added to 62.89 g of water and mixed at 2,500 rpm and 70° C. for 180 minutes with a Homomixer to prepare a 10.2 wt % copolymer dispersion in which the copolymer was dispersed. 2.86 g of plate-shaped graphite having an average particle diameter (D50) of 3.5 μm and a specific surface area of 17.0 m$^2$/g, as a graphite-type conductive agent, 11.16 g of the carbon nanotube dispersion, 30.95 g of water, and 25 g of silicon particles having an average particle diameter (D50) of 6 μm were added to 70.03 g of the copolymer dispersion and dispersed at 2,500 rpm for 60 minutes with a Homomixer to prepare a composition for a secondary battery electrode. The composition for a secondary battery electrode thus prepared was a mixed solution (solid content 25.0 wt %) in which the silicon particles, the conductive agent (carbon nanotubes, graphite-type conductive agent), and the copolymer were mixed at a weight ratio of 70:10:20. A weight ratio of the carbon nanotubes to the graphite-type conductive agent in the conductive agent was 20:80.

(3) Preparation of Negative Electrode

The negative electrode slurry prepared was coated on a 15 μm thick negative electrode collector such that an electrode loading (mg/cm$^2$) was 4.34 mg per unit area, and dried in a vacuum oven at 130° C. for 10 hours. Thereafter, the coated negative electrode collector was rolled between rolls heated to 50° C. at a pressure of 15 MPa to prepare a negative electrode (secondary battery electrode) having a final thickness (current collector+active material layer) of 32.0 μm and a loading amount of the negative electrode active material layer of 45.5 mg/25 cm$^2$.

Examples 2 to 6 and Comparative Examples 1 to 4: Preparation of Secondary Batteries Negative electrodes and secondary batteries were prepared in the same manner as in Example 1 except that negative electrode slurries were prepared as illustrated in Table 1.

Comparative Example 5: Preparation of Secondary Battery (1) Preparation of Negative Electrode Slurry 0.89 g of carboxymethyl cellulose (CMC) powder was added to 80.28 g of water and mixed at 2,500 rpm for 180 minutes with a Homomixer to prepare a CMC aqueous solution in which 1.1 wt % of the CMC was included. 2.86 g of plate-shaped graphite having an average particle diameter (D50) of 3.5 μm and a specific surface area of 17.0 m$^2$/g, as a graphite-type conductive agent, and 7.2 g of water were added to 4.06 g of the aqueous solution and mixed at 2,500 rpm for 10 minutes with a Homomixer to prepare a conductive agent dispersion. 25 g of silicon particles having an average particle diameter ($D_{50}$) of 6 μm were added to the dispersion, and mixed at 60 rpm for 20 minutes using a planetary mixer. Thereafter, 11.16 g of the carbon nanotube dispersion used in Example 1 was added to the dispersion and again dispersed for 20 minutes. Thereafter, 77.11 g of the CMC aqueous solution was further added to the dispersion and further stirred at the same rpm for 20 minutes. Finally, 15.47 g of an SBR aqueous solution with a solid content of 40.4 wt % was added and stirred at 1,000 rpm for 10 minutes with a Homomixer. The composition for a secondary battery electrode thus prepared was a mixed solution (solid content 28.0 wt %), in which the silicon particles, the conductive agent (carbon nanotubes, graphite-type conductive agent), the CMC, and the SBR were mixed at a weight ratio of 70:10:2.5:17.5, and the conductive agent included the carbon nanotubes and the graphite-type conductive agent in a weight ratio of 2:8.

(2) Preparation of Negative Electrode

The negative electrode slurry prepared was coated on a 15 μm thick negative electrode collector such that an electrode loading (mg/cm$^2$) was 4.34 mg per unit area, and dried in a vacuum oven at 130° C. for 10 hours. Thereafter, the coated negative electrode collector was rolled between rolls heated to 50° C. at a pressure of 15 MPa to prepare a negative electrode (secondary battery electrode) having a final thickness (current collector+active material layer) of 32.0 μm and a loading amount of the negative electrode active material layer of 45.5 mg/25 cm$^2$.

Experimental Example 1: Evaluation of Capacity Retention with Cycles

Cycle characteristics of the negative electrodes prepared in Examples 1 to 6 and Comparative Examples 1 to 5 were evaluated as follows and then presented in FIGS. 1 to 6.

(1) Preparation of Coin Half-Cell

A lithium (Li) metal thin film cut into a circle of area 1.76715 cm$^2$ was used as a positive electrode. A porous polyethylene separator was disposed between the positive electrode and the negative electrode prepared as described above to assemble a battery, and a lithium coin half-cell was prepared by injecting an electrolyte solution (dimethyl carbonate (DMC)/fluoroethylene carbonate (FEC)=7/3 (volume ratio), vinylene carbonate 3 wt %, lithium hexafluorophosphate (LiPF$_6$) 1 M concentration) into the assembled battery.

(2) Evaluation

Charge and discharge of each of the coin half-cells were performed under the following conditions.

1$^{st}$ cycle: charge was performed at a constant current of 0.1 C and constant voltage charge (0.05 V) was performed when the voltage and current reached 0.05 V and 0.005 C. Constant current (0.1 C) discharge was performed to 1.5 V.

2$^{nd}$ cycle: charge was performed at a constant current of 0.1 C and constant voltage charge (0.05 V) was performed when the voltage and current reached 0.05 V and 0.005 C. Constant current (0.1 C) discharge was performed to 1.0 V.

3$^{rd}$ to 30th cycle: charge was performed at a constant current of 0.5 C and constant voltage charge (0.05 V) was performed when the voltage and current reached 0.05 V and 0.005 C. Constant current (0.5 C) discharge was performed to 1.0 V.

Capacity retention was derived by the following calculation.

$$\text{Capacity retention (\%)} = (n^{th} \text{ cycle discharge capacity} / 1^{st} \text{ cycle discharge capacity}) \times 100$$

TABLE 2

| Negative electrode | Capacity retention (%, 30 cycles) |
|---|---|
| Example 1 | 59.9 |
| Example 2 | 50.9 |
| Example 3 | 56.1 |
| Example 4 | 50.8 |
| Example 5 | 49.1 |
| Example 6 | 46.0 |
| Comparative Example 1 | 40.0 |
| Comparative Example 2 | 29.7 |
| Comparative Example 3 | 29.4 |
| Comparative Example 4 | 38.5 |
| Comparative Example 5 | 14.2 |

Figure 2:
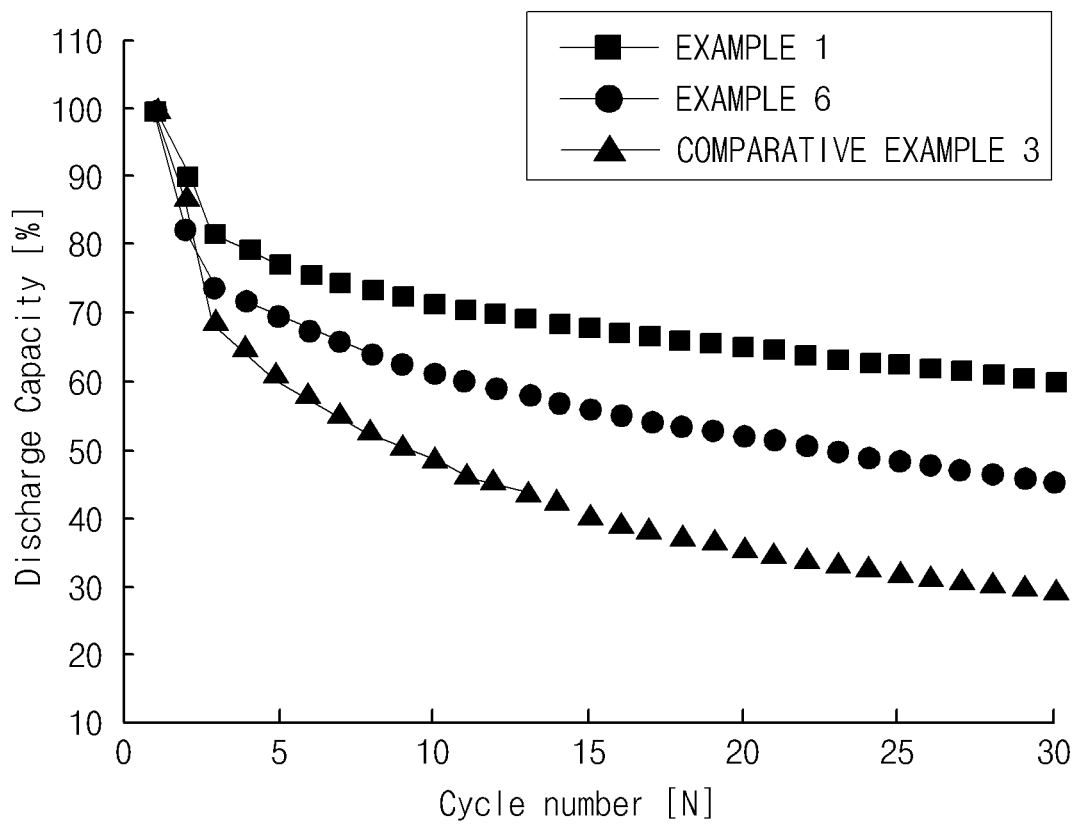
FIG. 2 is a graph illustrating capacity retentions of batteries respectively using negative electrodes of Example 1, Example 6, and Comparative Example 3 with cycles.

Referring to Table 2 and FIGS. 1 to 6, it may be understood that capacity retentions of the examples, in which the above-described specific binder and silicon particles having a specific diameter, as a negative electrode active material, were used, were significantly better than those of the comparative examples which did not include the above-described specific binder and silicon particles having a specific diameter. Specifically, referring to Table 2 and FIG. 1, it may be understood that the capacity retention of Example 1, in which the diameter of the silicon particles was appropriate at 6 μm, was higher than the capacity retentions of Comparative Examples 1 and 2 in which the diameters of the silicon particles were excessively small or large. Referring to Table 2 and FIG. 2, Comparative Example 3, in which the copolymer containing the polyvinyl alcohol-derived unit and the non-ionized unsubstituted acrylate-derived unit was used as the binder, exhibited a significantly lower capacity retention than Example 1. Also, it may be understood that Example 1 using the binder, in which all of the acrylate-derived units were ionized and substituted, exhibited a higher capacity retention than Example 6 using the binder in which only 58.6 mol % of the acrylate-derived units was ionized and substituted.

Figure 3:
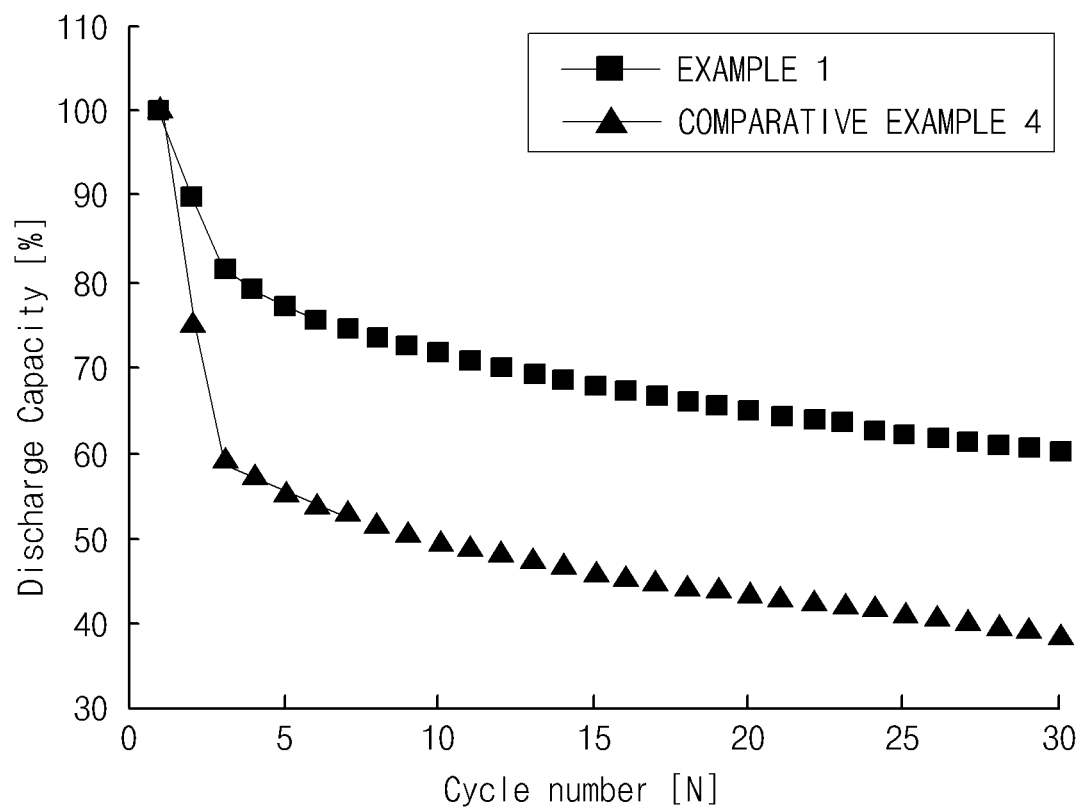
FIG. 3 is a graph illustrating capacity retentions of batteries respectively using negative electrodes of Example 1 and Comparative Example 4 with cycles.

Referring to Table 2 and FIG. 3, it may be understood that the capacity retention of Comparative Example 4, in which the graphite-type conductive agent was only used as the conductive agent, was lower than the capacity retention of Example 1 in which the carbon nanotubes and the graphite-type conductive agent were used together.

Figure 4:
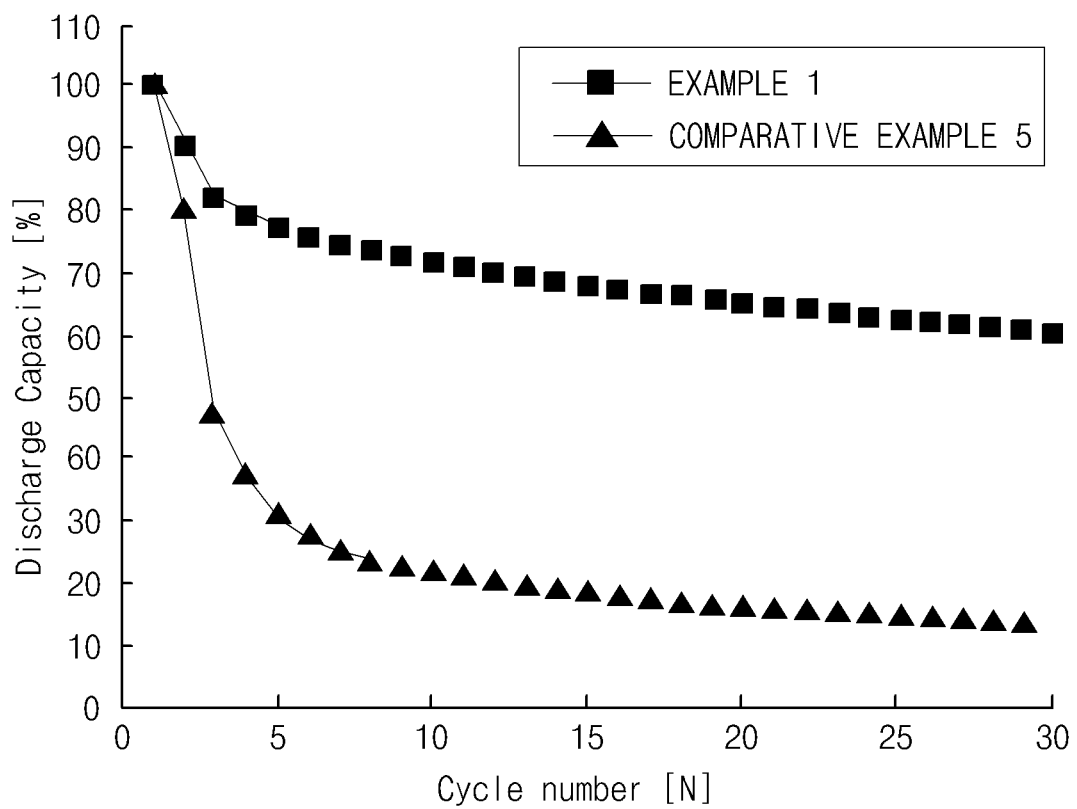
FIG. 4 is a graph illustrating capacity retentions of batteries respectively using negative electrodes of Example 1 and Comparative Example 5 with cycles.

Referring to Table 2 and FIG. 4, it may be understood that the capacity retention of Example 1 was significantly higher than that of Comparative Example 5 using CMC and SBR, conventional binders.

Figure 5:
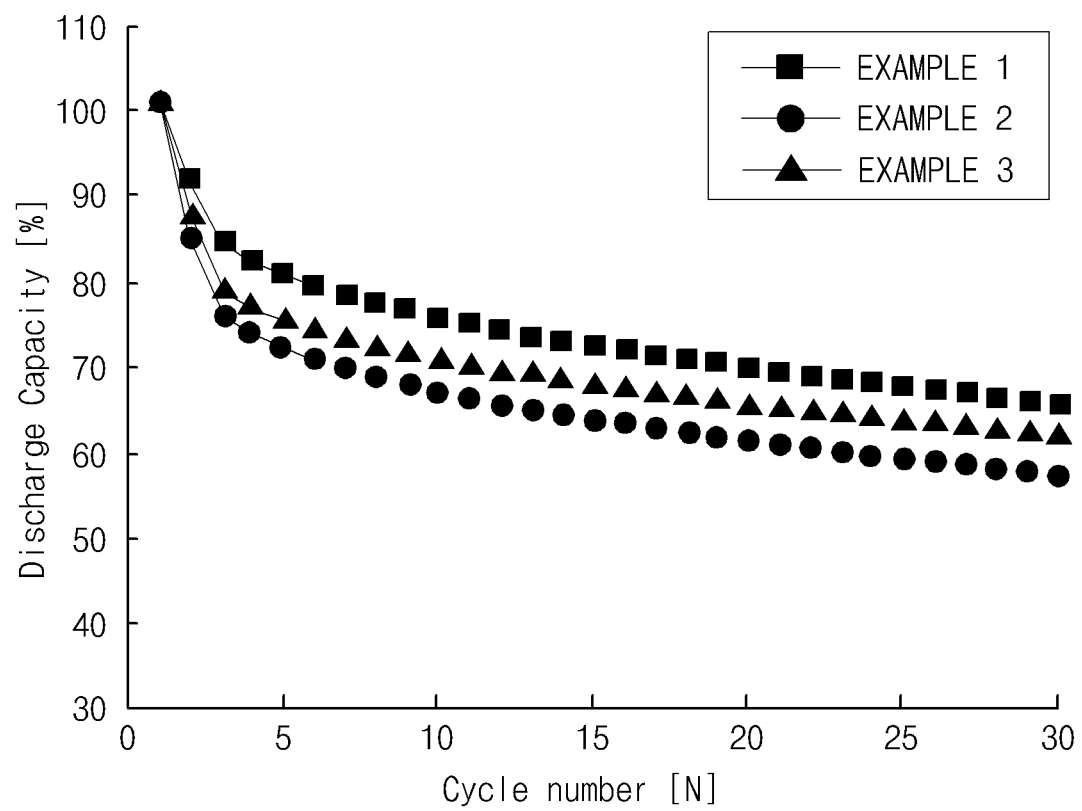
FIG. 5 is a graph illustrating capacity retentions of batteries respectively using negative electrodes of Example 1, Example 2, and Example 3 with cycles.

Referring to Table 2 and FIG. 5, it may be understood that the capacity retention of Example 1, in which the weight ratio of the carbon nanotubes to the graphite-type conductive agent was 20:80, was higher than the capacity retentions of Examples 2 and 3 in which the weight ratios were 25:75 and 15:85, respectively.

Figure 6:
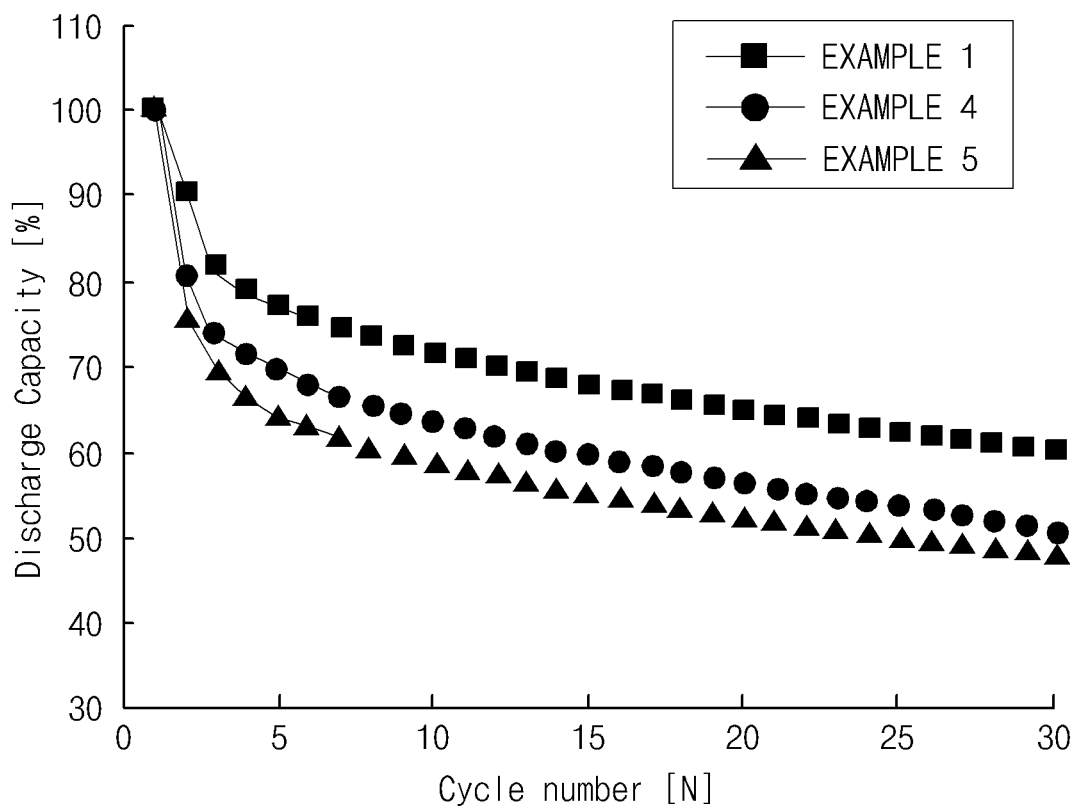
FIG. 6 is a graph illustrating capacity retentions of batteries respectively using negative electrodes of Example 1, Example 4, and Example 5 with cycles.

Referring to Table 2 and FIG. 6, it may be understood that the capacity retention of Example 1, in which the amount of the binder used was 20 wt %, was higher than the capacity retentions of Examples 4 and 5 in which the amounts of the binder used were 14 wt % and 26 wt %, respectively.

The invention claimed is:

1. A negative electrode comprising a current collector and a negative electrode active material layer disposed on the current collector,
   wherein the negative electrode active material layer comprises a negative electrode active material; a conductive agent; and a binder,
   wherein the negative electrode active material comprises silicon particles having an average particle diameter ($D_{50}$) of 4 μm to 10 μm,
   the conductive agent comprises carbon nanotubes and a graphite-type conductive agent, and
   the binder comprises a copolymer containing a polyvinyl alcohol-derived unit and an ionized substituted acrylate-derived unit.

2. The negative electrode of claim 1, wherein the polyvinyl alcohol-derived unit comprises a unit of Formula 1, and

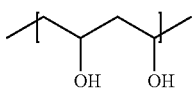

[Formula 1]

the ionized substituted acrylate-derived unit comprises a unit of Formula 2,

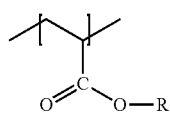

[Formula 2]

wherein, in Formula 2, R is at least one metal cation selected from the group consisting of sodium cation ($Na^+$), lithium cation ($Li^+$), and potassium cation ($K^+$).

3. The negative electrode of claim 1, wherein the copolymer contains the polyvinyl alcohol-derived unit and the ionized substituted acrylate-derived unit in a weight ratio of 6:4 to 8:2.

4. The negative electrode of claim 1, wherein the ionized substituted acrylate-derived unit comprises at least one salt selected from the group consisting of sodium acrylate and lithium acrylate.

5. The negative electrode of claim 1, wherein the copolymer has a weight-average molecular weight of 100,000 to 500,000.

6. The negative electrode of claim 1, wherein, in the binder,
   a mole fraction of the ionized substituted acrylate-derived unit in a total number of moles of units excluding the polyvinyl alcohol-derived unit is in a range of 98 mol % to 100 mol %.

7. The negative electrode of claim 1, wherein the binder is included in an amount of 13 wt % to 27 wt % in the negative electrode active material layer.

8. The negative electrode of claim 1, wherein the carbon nanotubes are bundle-type carbon nanotubes which include a plurality of carbon nanotube units.

9. The negative electrode of claim 8, wherein a carbon nanotube unit of the plurality of carbon nanotube units has an average diameter of 10 nm to 50 nm.

10. The negative electrode of claim 1, wherein the graphite-type conductive agent comprises at least one selected from the group consisting of plate-shaped graphite, graphene, graphene oxide, and graphite flakes.

11. The negative electrode of claim 1, wherein a weight ratio of the carbon nanotubes to the graphite-type conductive agent is in a range of 6:94 to 30:70.

12. The negative electrode of claim 1, wherein the negative electrode active material is included in an amount of 60 wt % to 80 wt % in the negative electrode active material layer.

13. The negative electrode of claim 1, wherein the conductive agent is included in an amount of 7 wt % to 13 wt % in the negative electrode active material layer.

14. The negative electrode of claim 1, further comprising an additive,
   wherein the negative electrode active material further comprises graphite, and
   the silicon particles have a $D_{10}$ of 0.2 μm or more and a $D_{90}$ of 20 μm or less, and a difference between the $D_{90}$ and the $D_{10}$ is 15 μm or less.

15. A secondary battery comprising:
   the negative electrode of claim 1;
   a positive electrode;
   a separator disposed between the positive electrode and the negative electrode; and
   an electrolyte.

* * * * *